United States Patent [19]

Argent

[11] Patent Number: 4,831,633
[45] Date of Patent: May 16, 1989

[54] GLASS MELTING FURNACE

[75] Inventor: Ronald D. Argent, Allison Park, Pa.

[73] Assignee: King, Taudevin & Gregson (Holdings) Limited, Sheffield, United Kingdom

[21] Appl. No.: 200,709

[22] Filed: Jun. 1, 1988

[51] Int. Cl.$^4$ .............................................. C03B 5/027
[52] U.S. Cl. ........................................ 373/32; 373/33; 373/34
[58] Field of Search ....................... 373/30, 31, 32, 33, 373/34, 35; 65/135, 136, 337, 355, 335, 347, DIG. 4

[56] References Cited

U.S. PATENT DOCUMENTS

| | | | |
|---|---|---|---|
| 2,512,761 | 6/1950 | Arbeit | 373/31 |
| 2,636,914 | 4/1953 | Arbeit | 373/31 |
| 2,975,224 | 3/1961 | Burch | 373/32 |
| 3,897,234 | 7/1975 | Froberg | 373/32 |

Primary Examiner—Roy N. Envall, Jr.
Attorney, Agent, or Firm—Shoemaker and Mattare, Ltd.

[57] ABSTRACT

Glass is made from a feed consisting of batch materials and cullet in a furnace that is both electrically and gas fired. A batch-only hopper discharges through a blanket conveyor to a batch melting chamber that is electrically fired and is connected via a submerged throat to a fritting chamber where the at least partly molten batch materials are mixed with cullet fed from cullet-only hoppers by blanket feeders. The fritting chamber is fired by a combination of electricity and roof-mounted flat flame burners. Material passes from the fritting chamber to a secondary reheating and refining chamber which is heated by regenerative gas burners. The separation of batch materials from cullet and separate melting thereof in a pre-melter means that the feed to the secondary refining and conditioning chamber is relatively free of fines and requirement to melt only cullet in the fritting chamber and secondary refining chamber enables those chambers to be operated at a lower temperature than the batch melting chamber. The resulting furnace makes efficient use of gaseous combustion and electrical energy and has low emissions of fines and oxides of nitrogen.

8 Claims, 2 Drawing Sheets

4,831,633

GLASS MELTING FURNACE

FIELD OF THE INVENTION

This invention relates to a method and apparatus for melting glass from a feed consisting of batch materials and cullet.

BACKGROUND OF THE INVENTION

Various methods have been adopted for reducing particulate emissions from a glass melting furnace. Addition of water to the batch results in a higher melt energy and involves additional furnace equipment. An electrostatic precipitator involves high capital cost and continuing maintenance costs. Melting by means of electrical power only involves a high capital cost, high running cost and a short furnace campaign.

SUMMARY OF THE INVENTION

It is an object of the invention to provide a method and apparatus for making glass from glass-making materials and cullet which can accept high levels of cullet and which has relatively low levels of environmental emission.

It is a further object of the invention to provide a method and apparatus for making glass from glass-making materials and cullet which can accept high levels of cullet and has relatively low levels of environmetal emission and that makes economic use of electricity and gas in its operation.

The problem to be solved has two aspects: emissions in an electric furnace are low but an electric melting furance is expensive to operate; a conventional gas-fired furnace suffers from emission problems caused by batch materials, batch dust, cullet dust and fines. The solution to this problem is to separate the cullet which does not give rise to emission problems from the other materials which do, melt the problem-causing materials electrically and melt the cullet by the least expensive melting method which may be wholly by gas or by a combination of electricity and gas. Increasing levels of recycled glass can be expected in the feed material to glass melting furnace, especially for container-type glasses (bottle glass) because of recycling. Thus if the feed to the furnace is 50% recycled glass, that glass does not have to be melted by expensive electrical melting methods because it does not contribute significantly to the emission levels of the furnace.

The invention provides a glass-melting furnace for meltng glass from a feed consisting of batch materials and cullet, said furnace comprising:

(a) a first electrically fired melting chamber in which batch materials are at least partly melted at a first relatively high temperature;

(b) means for feeding batch materials to the first melting chamber;

(c) a second melting chamber at least partly fired by gas in which melting of the cullet takes place and formation of a homogeneous glass is completed at temperatures less than that in the first melting chamber;

(d) means for feeding cullet to the second melting chamber; and (e) submerged throat means for leading at least partially melted batch materials from the first melting chamber to the second melting chamber so that the product entering the main melting chamber is relatively free of batch dust and harmful emissions from the furnace are reduced.

The invention further provides a method for forming glass from a feed consisting of batching materials and cullet comprising:

feeding batch materials by means of a blanket conveyor into a first electrically fired melting chamber in which the batch materials become at least partly molten at a first relatively high temperature;

passing the at least partly molten material by means of a submerged throat from the first melting chamber to a second melting chamber at least partly fired by gas;

feeding cullet by means of blanket feeder means to the second melting chamber so that the cullet becomes mixed with the at least partly melted batch materials and melting the cullet and forming homogeneous molten glass at second temperatures less than the first temperature, whereby the product entering the main melting chamber is relatively free of batch dust and harmful emissions are reduced.

A particular advantage of the method above described is that the low dust levels in the second melting chamber enable it to be used with regenerative gas burners which offer the best heating efficiency, losing only 300° F. between exhaust gas temperature and air preheat temperature. A regenerative gas burner installation also has low capital cost and can be maintained continuously during the furnace campaign so that its effective rebuild/repair downtime is close to zero.

BRIEF DESCRIPTION OF THE DRAWINGS

Various forms of the invention will now be described, by way of example only, with reference to the accompanying drawings, in which.

DETAILED DESCRIPTION OF PREFERRED FORMS OF THE INVENTION

Figure 1:
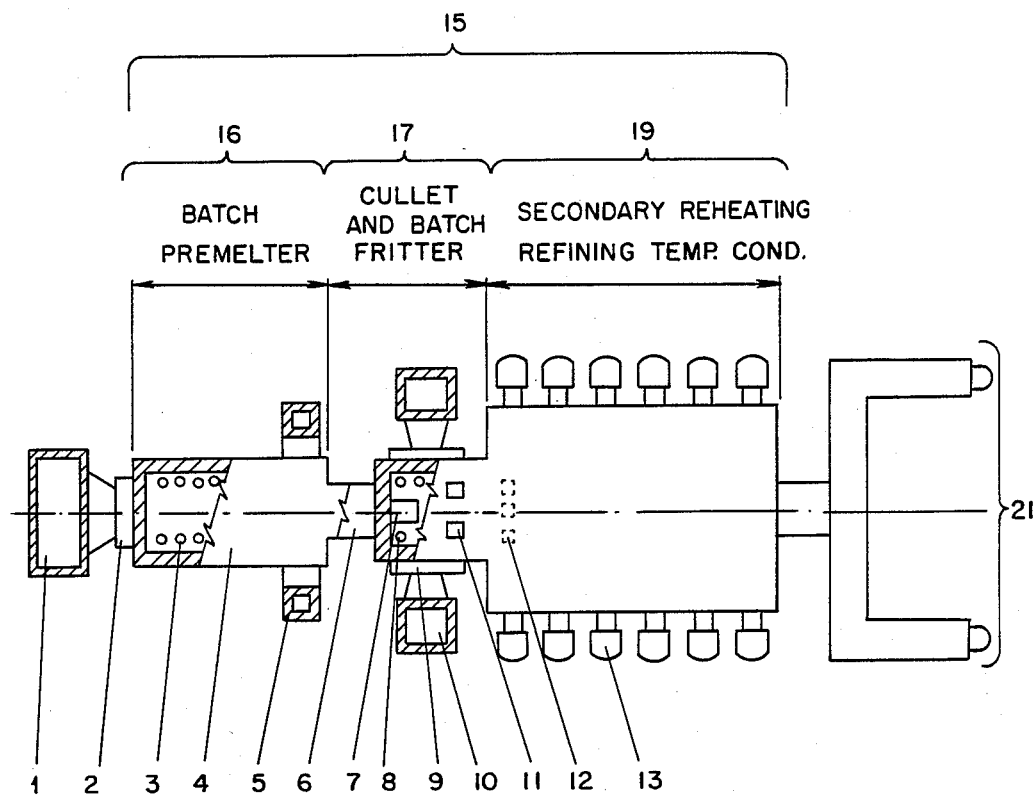
FIG. 1 is a diagrammatic plan of a first form of glass melting furnace illustrating the adaption of the principles of this invention to a new installation.

In FIG. 1, a glass melting furnace 15 has in series connection a batch pre-melting chamber 16, a cullet and batch fritting chamber 17 and a secondary reheating and refining chamber 19 from which glass passes to discharge ports 21. Batch materials, which include glass-making raw materials, baghouse fines and fines from a cullet recycling system associated with the furnace, or any materials that might give rise to a carry-over problem. These materials are fed, according to the invention, to the batch pre-melting chamber 16 through a batch-only hopper 1, whereas cullet is kept separate and is added through cullet-only hoppers 10 to the cullet and batch fritting chamber 17. Because batch materials require a relatively high temperature to melt, the batch pre-melter is operated at a high temperature, but melting of cullet in the cullet and batch fritting chamber 17 occurs at a lower temperature, and the secondary reheating and refining chamber 19 can also be operated at the lower temperature. The batch pre-melter 16 and cullet and batch fritter 17 are electrically fired or the chamber 17 is fired by a combination of gas and electricity, but the relatively long and wide secondary reheating and refining chamber 19 is gas-fired by regenerative burners 13. A submerged throat 6 permits passage of molten glass from the batch pre-melting chamber 16 to the cullet and batch fritting chamber 17, whilst preventing escape of fines and oxides of nitrogen which give rise to environmetal problems. The cullet and batch fritting chamber 17 and the secondary reheating and refining chamber 19 are in both liquid and gas communication, but operate at slightly lesser temperatures which gives rise to less nitrogen oxide emissions and cullet which is added at chamber 17 does not give rise to fines. The arrangement described above has the advantages that the need for add-on anti-pollution equipment such as an electrostatic precipitator is avoided, energy is supplied in the form and in the locations where it is most beneficial, repair times and costs are reduced, high levels of cullet can be processed and compensators for refining or de-colourisation can be added if required.

Thus a batch-only hopper 1 holds batch materials to be fed to the pre-melting chamber 16 by means of a blanket feeder 2. The chamber 16 has a multiplicity of molybdenum heating electrodes 3 upstanding from its floor into a body of molten glass therein with side wall electrodes if required. It has a flat crown 4 and flues 5 returning particulate and gaseous emissions to the baghouse. A liquid flow path and gas seal between the pre-melting chamber 16 and downstream regions of the furnace 15 is created by means of submerged electric throat 6 with a riser discharge 7 into the cullet and batch fritting chamber 17 or cullet charging pocket. The glass in the pre-melting chamber 16 is melted wholly electrically and is covered by a blanket of unmelted batch material supplied through feeder 2. The unmelted batch material is a poor conductor of heat, so that high temperatures can be achieved in the body of molten glass without correspondingly high temperatures at the furnace crown 4. The rising stream of melted batch material entering the fritting chamber 17 encounters cullet supplied from either side of chamber 17 from cullet-only hoppers 10 via cullet feeder 9. The use of two cullet charging systems improves mixing homogeneity and it is preferred that the feeders 9 should be blanket chargers rather than screw chargers which would be prone to wear or Gana type chargers which would add unduly to the complexity of the structure. The chamber 17 is heated by floor-upstanding molybdenum or tin electrodes 8 that may additionally have a gas-bubbling facility to aid mixing of the glass and cullet and is provided in its roof with gas-fired flat flame burners 11 so that the glass and cullet is heated by a combination of electricity and gas-derived heat. The main melting chamber 19 has bubblers 12 to assist mixing of the glass and may be fired by means of regenerative gas burners 13 which can be used despite their known disadvantage of carryover because the system as a whole has little tendency to carryover. The life of the main melting chamber 19 is extended because of the elminination of batch and the electric pre-melting chamber 16 can be repaired with a short downtime while maintaining the temperature in the chambers 17, 19.

Figure 2:
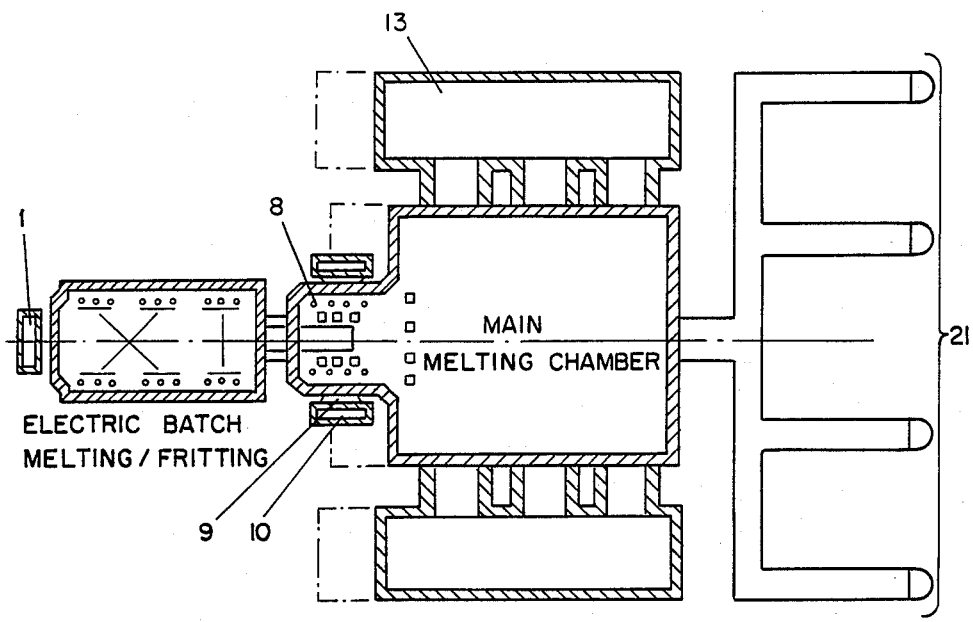
FIGS. 2 and 3 are respectively a diagrammatic plan and a section of an existing four port cross-fired regenerative furnace modified for operation according to the invention.
Figure 3:
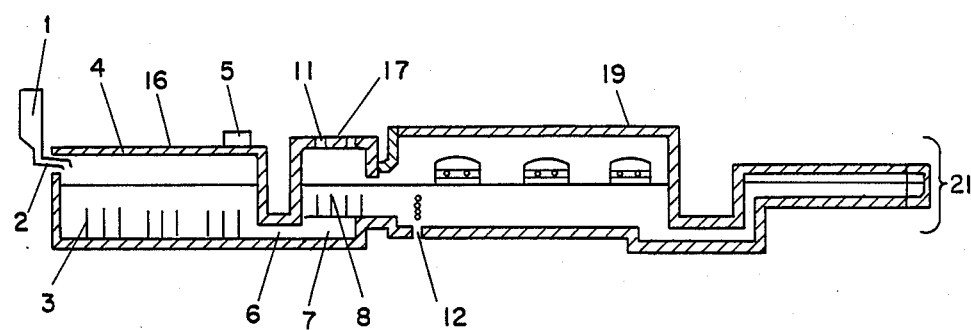

FIGS. 2 and 3 show the same principles applied to a 4-port cross fired regenerative furnace such as might be used to make about 300 tons per day of glass with an ability to melt up to 65% cullet in the incoming feed. Due to pre-melting of batch and fritting of the cullet with the hot batch melted glass, the material entering the main melting chamber 19 is clean by comparison to that of a more conventional furnace. The conventional 4-port regenerator 13 is reduced to 3-ports and the regenerator packing can be made with much smaller flues, thereby providing higher air preheating.

Use may be made of electrical boosting in the main melting chamber 19, and if desired the main melting chamber 19 may be made of reduced depth.

I claim:
1. A glass melting furnace for melting glass from a feed consisting of batch materials and cullet, said furnace comprising:
   (a) a first electrically fired melting chamber in which batch materials are at least partly melted at a first relatively high temperature;
   (b) means for feeding batch materials to the first melting chamber;
   (c) a second melting chamber at least partly fired by gas in which melting of the cullet takes place and formation of a homogeneous glass is completed at temperatures less than that in the first melting chamber;
   (d) means for feeding cullet to the second melting chamber; and
   (e) submerged throat means for leading at least partially melted batch materials from the first melting chamber to the second melting chamber so that the product entering the main melting chamber is relatively free of batch dust and harmful emissions from the furnace are reduced.

2. A furnace according to claim 1, wherein the means for feeding batch materials to the first melting chamber is a blanket conveyor.

3. A furnace according to claim 1, wherein the means for feeding cullet to the second melting chamber is a pair of blanket conveyers disposed to opposite sides of the furnace.

4. A furnace according to claim 1, wherein the second melting chamber is partitioned into an upstream sub-chamber fired by submerged electrodes and by overhead gas burner means into which sub-chamber the cullet feeding means discharges, and a downstream sub-chamber fired at least mainly by gas in which melting to a homogeneous glass is completed.

5. A furnace according to claim 4, wherein the overhead gas burner means is flat flame burners.

6. A furnace according to claim 4 or 5, wherein the downstream sub-chamber is fired by means of a regenerative gas burner.

7. A furnace according to claim 4, wherein the first chamber and the upstream sub-chamber are relatively narrow when viewed from an end of the furnace and the downstream sub-chamber is relatively wide.

8. A method for forming glass from a feed consisting of batching materials and cullet comprising:
   feeding batch materials by means of a blanket conveyer into a first electrically fired melting chamber in which the batch materials become at least partly molten at a first relatively high temperature;
   passing the at least partly molten material by means of a submerged throat from the first melting chamber to a second melting chamber at least partly fired by gas;
   feeding cullet by means of blanket feeder means to the second melting chamber so that the cullet becomes mixed with the at least partly melted batch materials and melting the cullet and forming homogeneous molten glass at second temperatures less than the first temperature, whereby the product entering the main melting chamber is relatively free of batch dust and harmful emissions are reduced.

* * * * *